US005735480A

United States Patent [19]
Arai et al.

[11] Patent Number: 5,735,480
[45] Date of Patent: Apr. 7, 1998

[54] RELAY APPARATUS FOR RELATIVE ROTATING MEMBERS

[75] Inventors: Kazuya Arai; Masakazu Umemura; Hiroyuki Okamoto; Takeshi Sakakibara; Satoshi Ishikawa; Hiraku Tanaka; Kazuhito Sakai, all of Shizuoka-ken, Japan

[73] Assignee: Yazaki Corporation, Tokyo, Japan

[21] Appl. No.: 693,947

[22] Filed: Aug. 7, 1996

[30] Foreign Application Priority Data

| Aug. 11, 1995 | [JP] | Japan | 7-206067 |
| Feb. 6, 1996 | [JP] | Japan | 8-020302 |
| Jun. 13, 1996 | [JP] | Japan | 8-152338 |

[51] Int. Cl.⁶ ............... B65H 75/02; H01R 3/00
[52] U.S. Cl. ............ 242/378; 439/15; 439/164
[58] Field of Search ............... 242/388, 388.1, 242/388.5, 388.6, 407, 378; 439/4, 13, 15; 191/12.2 R, 12.2 A, 12.4

[56] References Cited

U.S. PATENT DOCUMENTS

| 4,824,396 | 4/1989 | Sasaki et al. | 439/164 |
| 5,224,871 | 7/1993 | Ida et al. | 439/164 |
| 5,580,259 | 12/1996 | Bolen et al. | 439/15 |

FOREIGN PATENT DOCUMENTS

| 39 31 905 | 6/1990 | Germany. |
| 4-327469 | 11/1992 | Japan. |
| 6-26185 | 4/1994 | Japan. |
| 7-69538 | 3/1995 | Japan. |

*Primary Examiner*—John M. Jillions
*Attorney, Agent, or Firm*—Finnegan, Henderson, Farabow, Garrett & Dunner, L.L.P.

[57] ABSTRACT

A relay apparatus for relatively rotating members includes a first member (rotating member) having an internal cylindrical portion, a second member (fixed member) having an external cylindrical portion which surrounds the internal cylindrical portion with a predetermined gap and is relatively rotated with respect to the internal cylindrical portion, a flexible flat cable which is stored along an annular space between the internal cylindrical portion and the external cylindrical portion to be spirally wound and which has an inner peripheral portion held by the internal cylindrical portion and an outer peripheral portion held by the external cylindrical portion, and a C-shaped moving member, movably arranged along the space, for inverting the flexible flat cable 13 in an opening portion 21c. One member of the first member 11 and the second member as rotatably driven and, has a flange formed on the cylindrical portion, and the moving member is arranged on the flange.

16 Claims, 12 Drawing Sheets

1

RELAY APPARATUS FOR RELATIVE ROTATING MEMBERS

FIELD OF THE INVENTION

The present invention relates to a relay apparatus for relative rotating members in which electrical connection between relatively rotating members is performed through a cable.

DESCRIPTION OF THE RELATED ART

A conventional relay apparatus for relatively rotating members comprises, for example, a first rotating member having an internal cylindrical portion, a second rotating member having an external cylindrical portion surrounding the internal cylindrical portion with a predetermined gap, a flexible flat cable (to be referred to as a cable hereinafter) which is spirally wound to be stored in an annular space K between the internal cylindrical portion and the external cylindrical portion, and a C-shaped moving member, movably arranged along the space K, for inverting the cable in an opening of the C-shaped moving member.

The cable has an inner peripheral portion held by the internal cylindrical portion, and has an outer peripheral portion held by the external cylindrical portion. The C-shaped moving member is slidably arranged on a lower cover covering the lower end face of the space K. The second rotating member is integrated with the external cylindrical portion and the lower cover to rotatably support the first rotating member.

In the relay apparatus for relatively rotating members arranged described above, when the internal cylindrical portion is rotated clockwise with respect to the external cylindrical portion, the cable moves and is wound on the internal cylindrical portion. For this reason, the cable outside the moving member is brought into contact with the outer peripheral surface of the moving member, and is inverted while being in contact with one opening end to be inserted in the moving member. The cable is wound on the internal cylindrical portion. In this case, one opening end of the moving member is pressed by the cable rotating it clockwise. More specifically, the moving member slides on the lower cover.

When the internal cylindrical portion is rotated counterclockwise with respect to the external cylindrical portion, the cable wound on the internal cylindrical portion is rewound to be moved therearound. For this reason, the cable wound on the internal cylindrical portion is brought into contact with the inner peripheral surface of the moving member, and is inverted while in contact with another opening end to move outside the moving member. The cable is brought into contact with the inner surface of the external cylindrical portion. In this case, the other opening end of the moving member is pressed by the cable to be rotated counterclockwise. More specifically, the moving member slides on the lower cover.

In the relay apparatus for relatively rotating members described above, because the moving member slides on the lower cover with rotation of the internal cylindrical portion, sliding noise is disadvantageously generated. When the cable is rewound by rotation of the internal cylindrical portion, the cable is brought into contact with the other opening end of the moving member, thereby rotating the moving member. However, since sliding resistance is generated in the moving member, compression stress is generated in the cable as a reaction to the sliding resistance. For this reason, the cable buckles easily.

SUMMARY OF THE INVENTION

The present invention has been made to solve the above problem, and has as its object to provide a relay apparatus for relatively rotating members in which sliding noise of a moving member can be reduced, and buckling of a flexible flat cable can be prevented.

In order to achieve the above object, the invention in one embodiment comprises a first member having an internal cylindrical portion, a second member having an external cylindrical portion which surrounds the internal cylindrical portion with a predetermined gap and is relatively rotated with respect to the internal cylindrical portion, a flexible flat cable which is stored along an annular space between the internal cylindrical portion and the external cylindrical portion and which has an inner peripheral portion held by the internal cylindrical portion and an outer peripheral portion held by the external cylindrical portion, and a C-shaped moving member, movably arranged along the space, for inverting the flexible flat cable in an opening, and is characterized in that, of the first and second members, the member which is rotatably driven has a flange formed on the cylindrical portion, and the moving member is arranged on the flange.

The invention may be further characterized in that the moving member may be further integrally formed and consist of a resin material, and a dimension in a radial direction of the moving member can be elastically varied by changing a gap between one opening end (211a) and the other opening end (211b) in the opening (211c) of the moving member (21).

The invention according to another embodiment comprises a first member (11) having an internal cylindrical portion (11a), a second member (12) having an external cylindrical portion (12a) which surrounds the internal cylindrical portion (11a) with a predetermined gap and is relatively rotated with respect to the internal cylindrical portion (11a), a flexible flat cable (13) which is stored along an annular space (K) between the internal cylindrical portion (11a) and the external cylindrical portion (12a) and which has an inner peripheral portion (13a) held by the internal cylindrical portion (11a) and an outer peripheral portion (13b) held by the external cylindrical portion (12a), and a C-shaped moving member (21), movably arranged along the space (K), for inverting the flexible flat cable (13) in an opening, (211c), and is characterized in that the moving member (21) is integrally formed and consists of a resin material, and a dimension in a radial direction of the moving member can be elastically varied by changing a gap between one opening end (211a) and the other opening end (211b) in the opening (211c).

The invention can also be characterized in that a bridge portion (213) for connecting one opening end (211a) and the other opening end (211b) in the opening (211c) of the moving member (21) is arranged, and the bridge portion (213) can be flexibly bent by changing the gap between one opening end (211a) and the other opening end (211b).

The invention also may be characterized in that the moving member (21) has an inner diameter set to be a diameter such that the flexible flat cable (13) wound on the internal cylindrical portion (11a) and externally extended by elastic force is in contact with the moving member (21).

The invention according to another embodiment is characterized in that the moving member (21) has an inner diameter set to be slightly larger than the outer diameter of the flexible flat cable (13) wound on the internal cylindrical portion (11a) maximum times at a high density.

The invention can also be characterized in that the moving member (21) has an inner diameter set to be a diameter obtained by adding a value six times the thickness of the flexible flat cable (13) to the outer diameter of the internal cylindrical portion (11a).

The invention can also be characterized in that the moving member (21) has an inner diameter which decreases with time, the lower limit of the inner diameter is set by stopper means (214) arranged in the opening (211c), and the minimum inner diameter of the moving member (21) is set to be a diameter obtained by adding the thickness of one flexible flat cable (13) to the outer diameter of the internal cylindrical portion (11a).

The invention can also be characterized in that the moving member (21) consists of a gliding material.

In the first embodiment of the described above, for example, it is assumed that the first member is rotatably driven, that a flange is formed on the internal cylindrical portion, and that the moving member is mounted on the flange. In this case, when the flexible flat cable is rewound from the internal cylindrical portion with rotation of the internal cylindrical portion, the flexible flat cable moves to be extended therearound, and is brought into contact with the inner surface of the moving member. The flexible flat cable is inverted in the opening portion to move outside the moving member. At this time, since the flexible flat cable has an inner peripheral portion held by the internal cylindrical portion, the flexible flat cable rotatably moves by an amount equal to an amount of movement of the internal cylindrical portion. In addition, since the moving member is mounted on the flange, the moving member is to be moved in the same direction as that of the internal cylindrical portion by an amount equal to an amount of movement of the internal cylindrical portion. Therefore, the internal cylindrical portion, the flexible flat cable inside the moving member, and the moving member move in the same direction and by equal amounts.

However, since the amount of movement of the inverted portion of the flexible flat cable is smaller than the amount of movement of the moving member or the like, the amount of movement of the moving member is made smaller than the amount of movement of the internal cylindrical portion by the inverted portion of the flexible flat cable. For this reason, the moving member slides on the flange. An amount of sliding of the moving member is advantageously smaller than that obtained when the moving member is mounted on, e.g., the lower cover of the second rotating member which is not rotatably driven. Therefore, the sliding noise of the moving member can be reduced.

When the flexible flat cable is rewound, the flexible flat cable is extended outside to slide on the inner surface of the moving member. For this reason, compression stress is generated in the flexible flat cable, and the flexible flat cable buckles easily.

However, in the present invention since the moving member is arranged such that the moving member can be elastically deformed in the radial direction, the externally extending force of the flexible flat cable can be absorbed. Therefore, compression stress generated in the flexible flat cable can be reduced, and the flexible flat cable can be prevented from buckling.

Further, since the bridge portion (213) is freely bent by a change in gap between one opening end (211a) and the other opening end (211b), the elastic deformation of the moving member (21) in the radial direction is not prevented by the bridge portion (213). Therefore, due to the elastic deformation of the moving member (21) in the radial direction, the flexible flat cable (13) can be prevented from buckling. In addition, when the bridge portion (213) is not arranged, due to contraction of the molded resin material, the gap between one opening end (211a) and the other opening end (211b) may decrease, or one opening end (211a) and the opening end (211b) may be offset from each other in an axial direction. However, since a resin material can be filled in a cavity with good balance by arranging the bridge portion (213), a decrease in the gap between one opening end (211a) and the other opening end (211b) caused by contraction after molding can be prevented. In addition, the offset between one opening end (211a) and the other opening end (211b) in the axial direction can be prevented by the bridge portion (213).

More specifically, when the bridge portion (213) is arranged, the molding accuracy of the moving member (21) can be improved. Therefore, the flexible flat cable (13) can be stably guided by the moving member (21).

In the invention embodiment above the flexible flat cable (13) is extended outside the internal cylindrical portion (11a) by elastically extending force of the flexible flat cable (13). Since the inner surface of the moving member (21) is brought into contact with the flexible flat cable (13) which is elastically extended, movement of the moving member (21) in the radial and axial directions can be limited by the flexible flat cable (13). For this reason, the following noise can be prevented. That is, noise is generated when the moving member (21) is brought into contact with, e.g., the external cylindrical portion (12a), or noise generated when the moving member (21) is brought into contact with the upper and lower covers of the moving member (21).

Additionally since the inner diameter of the moving member (21) can be set to be slightly larger than the outer diameter of the flexible flat cable (13) wound on the internal cylindrical portion (11a) maximum times at a high density, the flexible flat cable (13) can be sufficiently wound in the moving member (21) with rotation of the first rotating member (11).

The thickness of the flexible flat cable (13) is set to be very small, and an amount of elastic extension of the flexible flat cable (13) from the internal cylindrical portion (11a) is considerably larger than the thickness of the flexible flat cable (13). For this reason, even if one flexible flat cable (13) is wound on the internal cylindrical portion 11a, the flexible flat cable (13) is in elastic contact with the inner surface of the moving member (21). Therefore, noise generated by moving the moving member (21) can be prevented.

Also since the inner diameter of the moving member (21) can be set to be a diameter obtained by adding a dimension six times the thickness of the flexible flat cable (13) to the outer diameter of the internal cylindrical portion (11a), the flexible flat cable (13) having a three-layered thickness can be wound in the moving member (21). In addition, noise generated by moving the moving member (21) can be prevented.

Further, the moving member (21) can have a dimension which can be elastically varied in the radial direction, and the inner diameter of the moving member (21) is decreased gradually over a period of time as relative rotation occurs. For this reason, the diameter of the moving member (21) does not increase In the future, a state in which the flexible flat cable (13) wound on the internal cylindrical portion (11a) is in contact with the moving member (21) can be kept. Therefore, noise generated by moving the moving member (21) can be prevented, a noise-proof effect can be held in the future.

In addition, since the lower limit of the inner diameter is set by the stopper means (214) arranged in the opening (211c), the inner diameter of the moving member (21) can be prevented from being excessively small, and an increase in resistance of winding and rewinding the flexible flat cable (13) in the moving member (21) can be prevented. Since the minimum inner diameter of the moving member (21) is set to be a diameter obtained by adding the thickness of one flexible flat cable (13) to the outer diameter of the internal cylindrical portion (11a), at least the first flexible flat cable (13) can be smoothly wound in the moving member (21). When the first flexible flat cable (13) is wound in the moving member (21), other portions of the flexible flat cable (13) can be continuously and smoothly wound in the moving member (21). More specifically, when the second or more flexible flat cables (13) are wound in the moving member (21), the moving member (21) gradually increases in diameter. However, since the flexible flat cable (13) is continuously formed to have a large length, resistance generated by an increase in diameter of the moving member (21) rarely increases.

Also, since the moving member consists of a gliding material, a sliding resistance of the flexible flat cable against the moving member can be reduced. Therefore, compression stress generated in the flexible flat cable can be further reduced, and the flexible flat cable can be prevented from buckling.

In the present invention it is assumed that the internal cylindrical portion (11a) is rotated in a direction in which the flexible flat cable (13) is rewound. In this manner, the flexible flat cable is inserted from the outside of the moving member (21) into the opening (211c) and inverted in the opening (211c) to be wound on the internal cylindrical portion (11a). In this case, since the moving member (21) is mounted on the flange (11b), the internal cylindrical portion, the flexible flat cable in the moving member, and the moving member move in the same direction by equal amounts.

However, since the amount of movement of the inverted portion of the flexible flat cable is smaller than the amount of movement of the moving member or the like, the amount of movement of the moving member is made smaller than the amount of movement of the internal cylindrical portion by the inverted portion of the flexible flat cable. For this reason, the moving member slides on the flange. An amount of sliding of the moving member is advantageously smaller than that obtained when the moving member is mounted on, e.g., the lower cover of the second rotating member which is not rotatably driven. Therefore, the sliding noise of the moving member can be reduced. In this case, since the flexible flat cable (13) is drawn by the internal cylindrical portion (11a), there is no reason to be afraid of buckling of the flexible flat cable.

In the present invention when the internal cylindrical portion (11a) is rotated to rewind the flexible flat cable (13), the flexible flat cable (13) is drawn by the internal cylindrical portion (11a). For this reason, there is no reason to be afraid of buckling of the flexible flat cable (13).

DETAILED DESCRIPTION OF THE PREFERRED EMBODIMENTS

Figure 4:
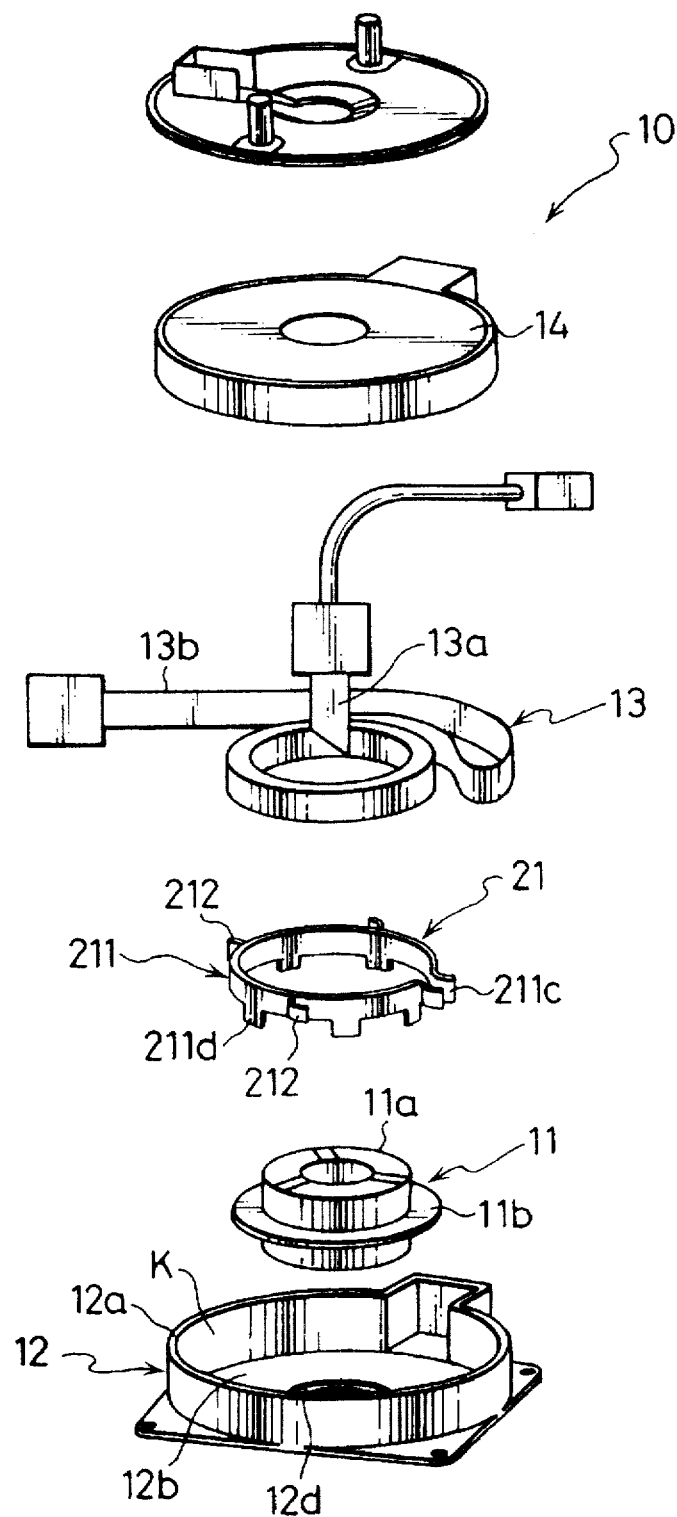
FIG. 4 is an exploded perspective view showing the relay apparatus for relatively rotating members in FIG. 1.
Figure 5:
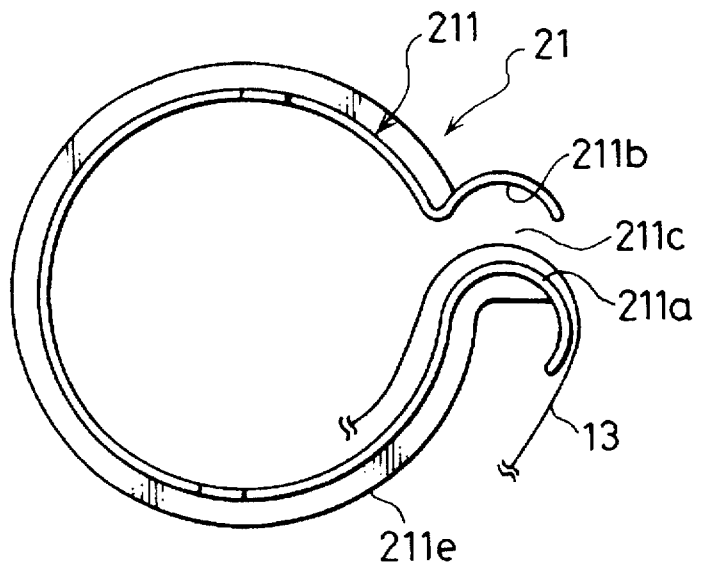
FIG. 5 is a plan view showing a first example of the moving member in the relay apparatus for relative rotating members in FIG. 1.
Figure 6:
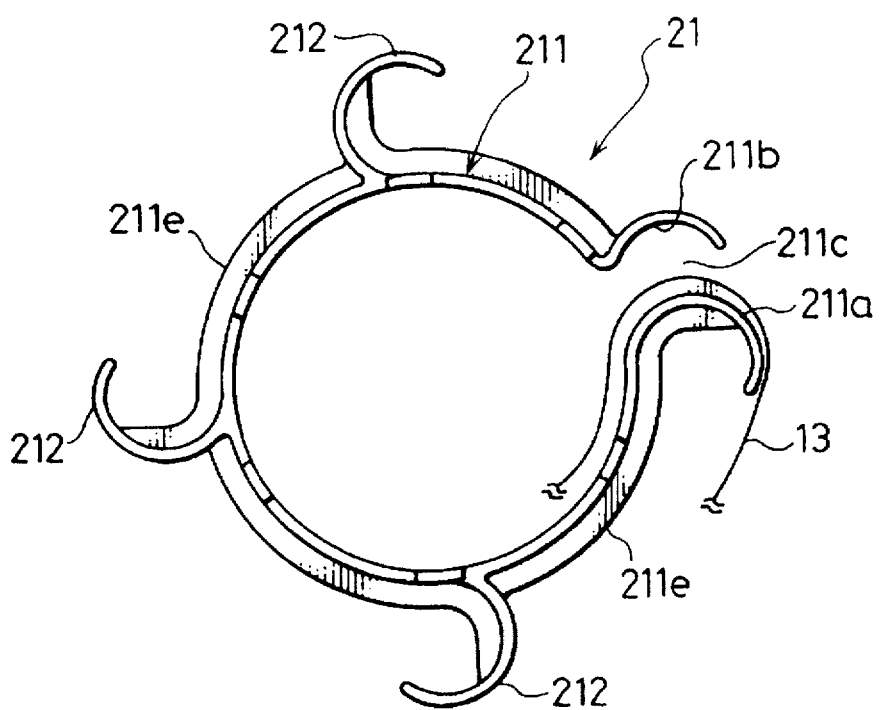
FIG. 6 is a plan view showing the second example of the moving member in the relay apparatus for relatively rotating members in FIG. 1.
Figure 7:
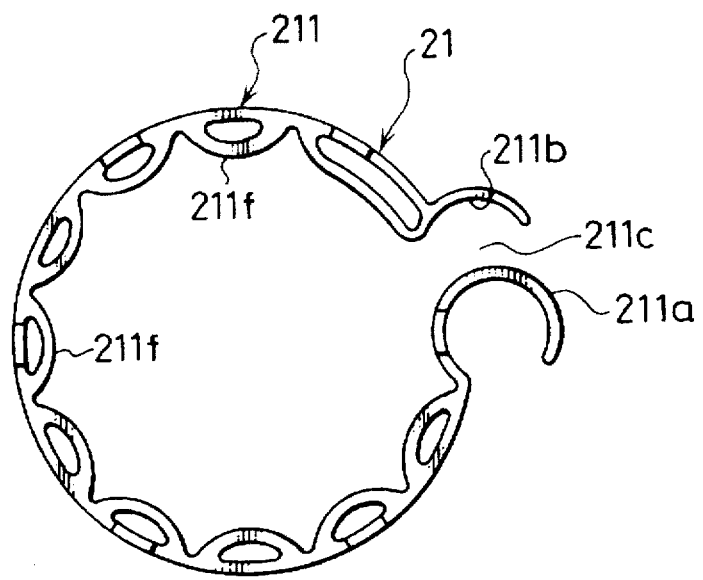
FIG. 7 is a plan view showing a third example of the moving member in the relay apparatus for relatively rotating members in FIG. 1.
Figure 8:
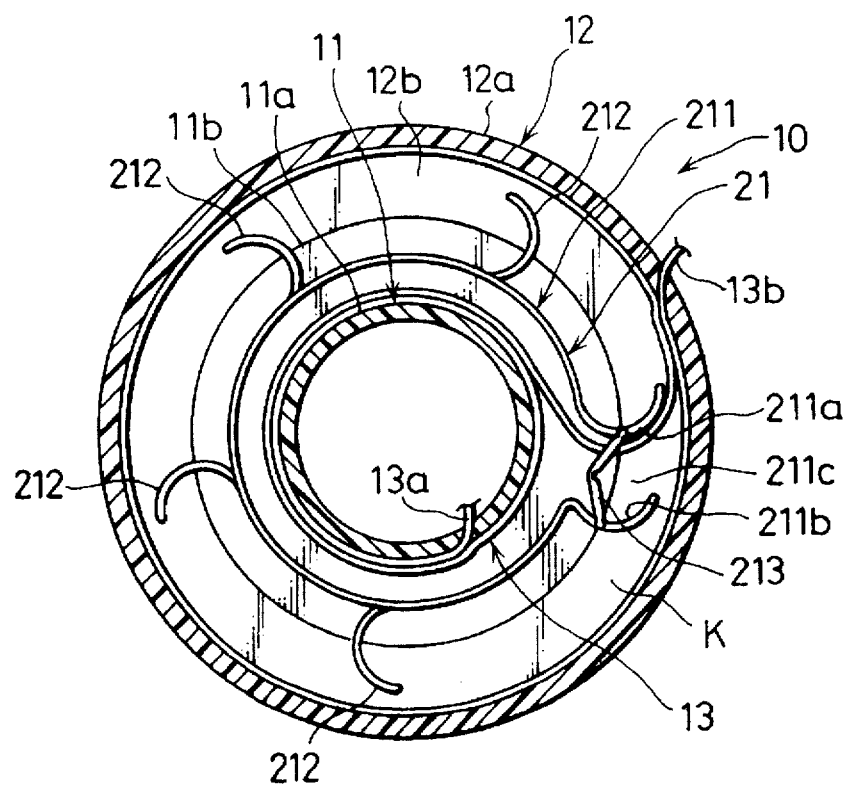
FIG. 8 is a sectional view showing a main part of a relay apparatus for relatively rotating members according to a second embodiment of the present invention.
Figure 9:
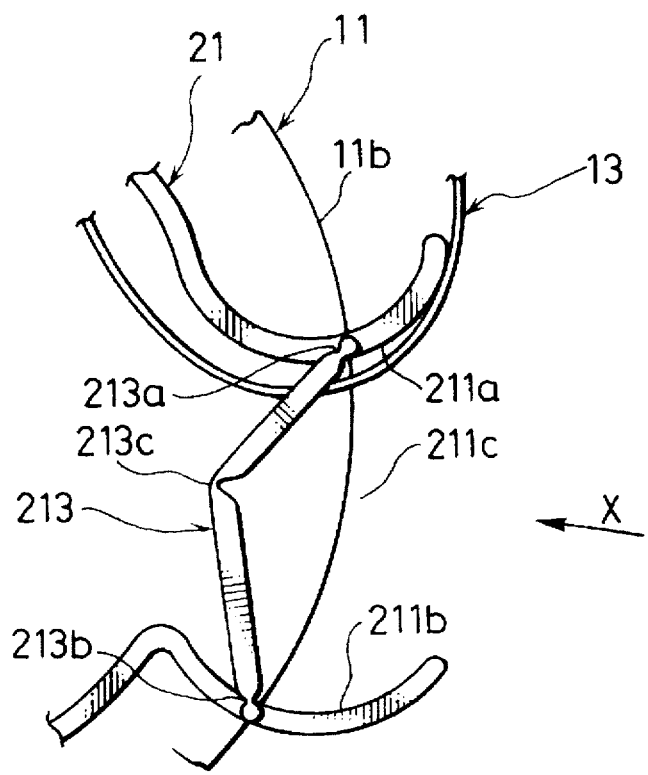
FIG. 9 is a plan view showing a main part of a bridge portion of a moving member in the relay apparatus for relatively rotating members in FIG. 8.
Figure 10:
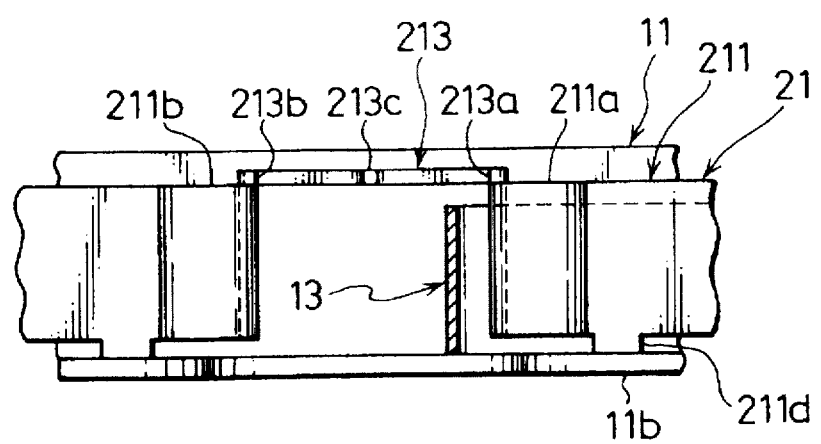
FIG. 10 is a sectional view showing the bridge portion of the moving member in the relay apparatus for relatively rotating members and is a view in the direction X in FIG. 9.
Figure 11:
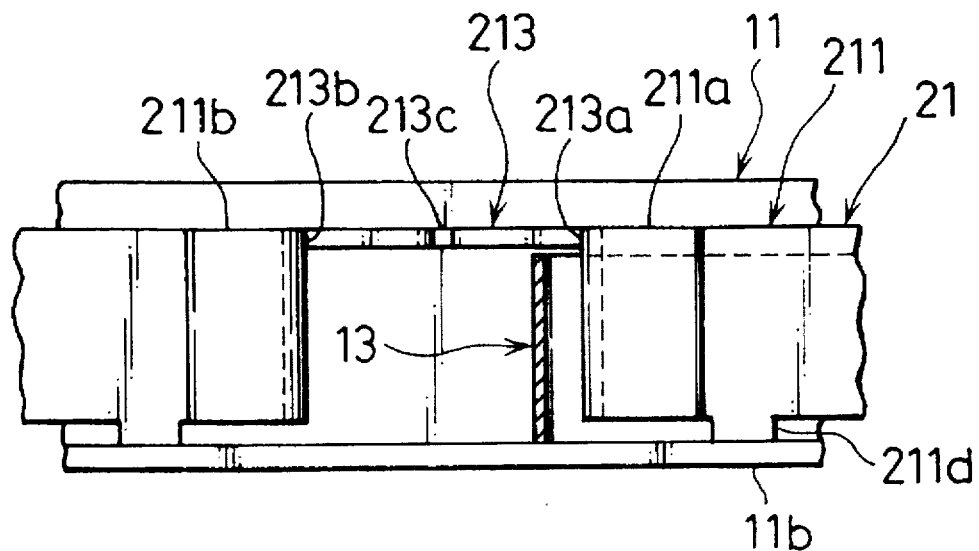
FIG. 11 is a view showing a first example of the bridge portion of the moving member in the relay apparatus for relatively rotating members in FIG. 8, and is a view corresponding to the view in the direction X in FIG. 9.
Figure 12:
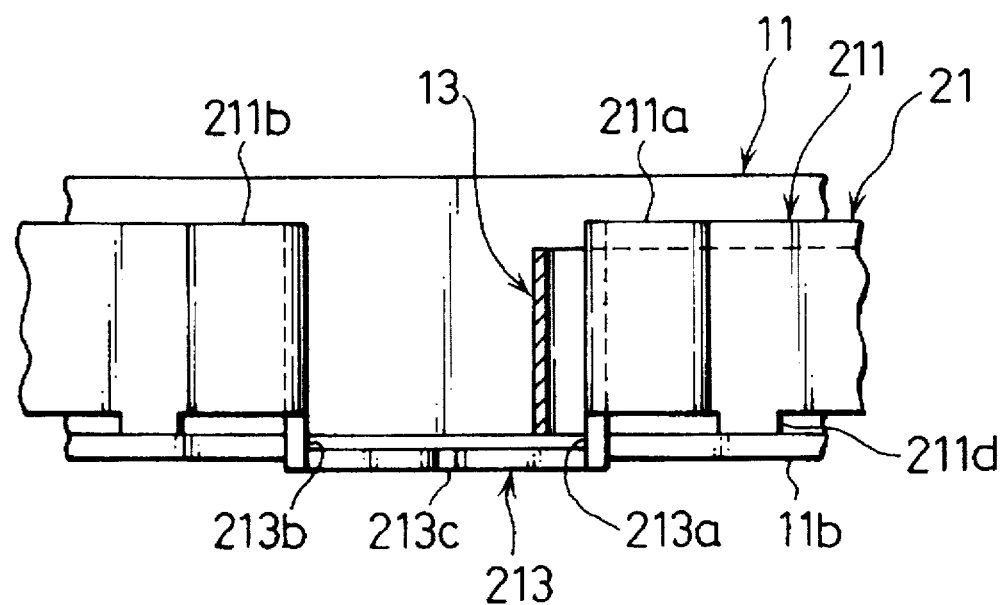
FIG. 12 is a view showing a second example of the bridge portion of the moving member in the relay apparatus for relatively rotating members in FIG. 8, and is a view corresponding to the view in the direction X in FIG. 9.
Figure 13:
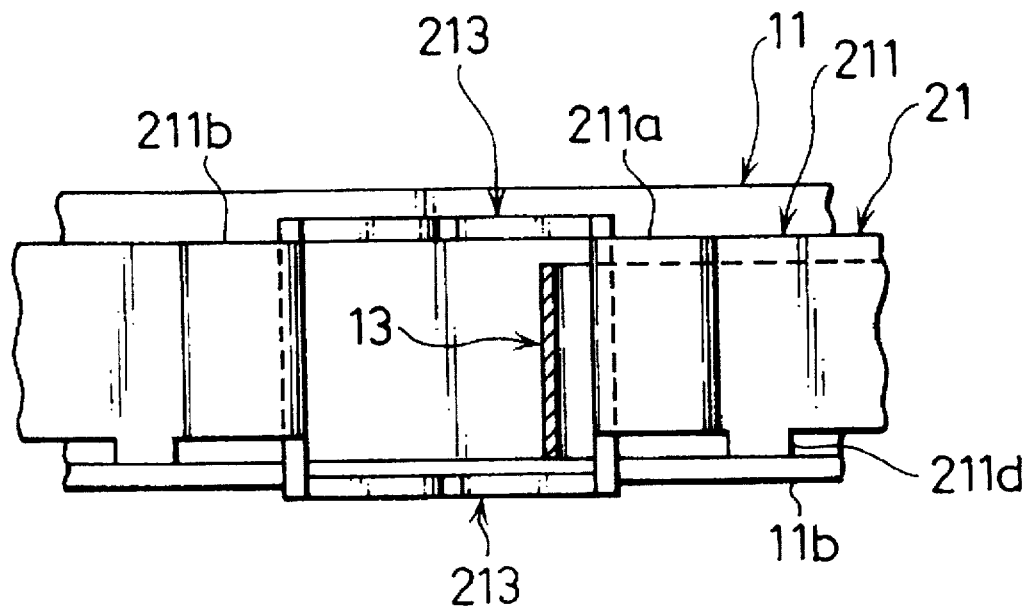
FIG. 13 is a view showing a third example of the bridge portion of the moving member in the relay apparatus for relatively rotating members in FIG. 8, and is a view corresponding to the view in the direction X in FIG. 9.
Figure 14:
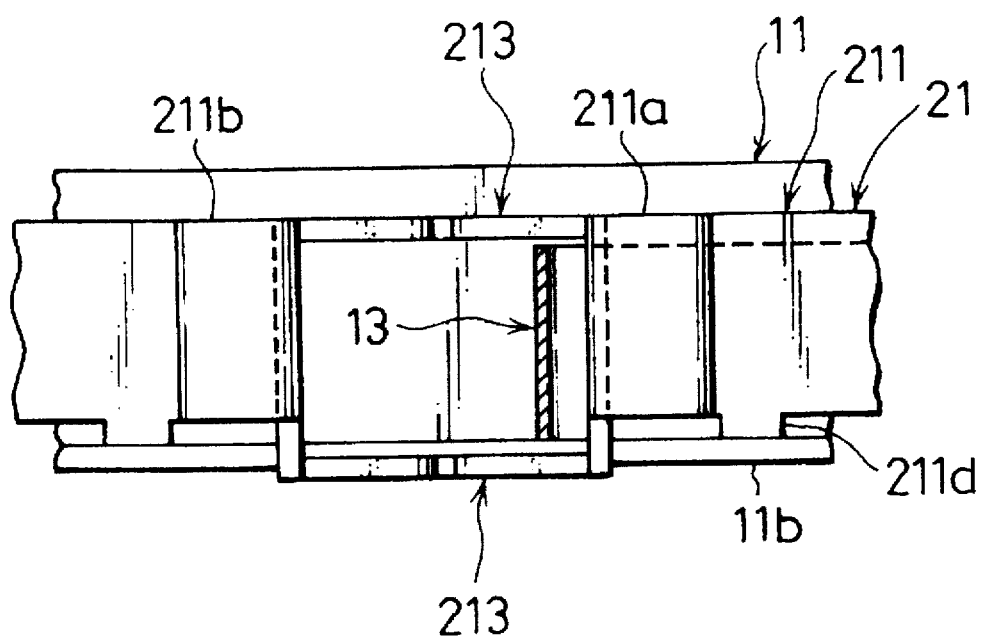
FIG. 14 is a view showing a fourth example of the bridge portion of the moving member in the relay apparatus for relatively rotating members in FIG. 8, and is a view corresponding to the view in the direction X in FIG. 9.
Figure 15:
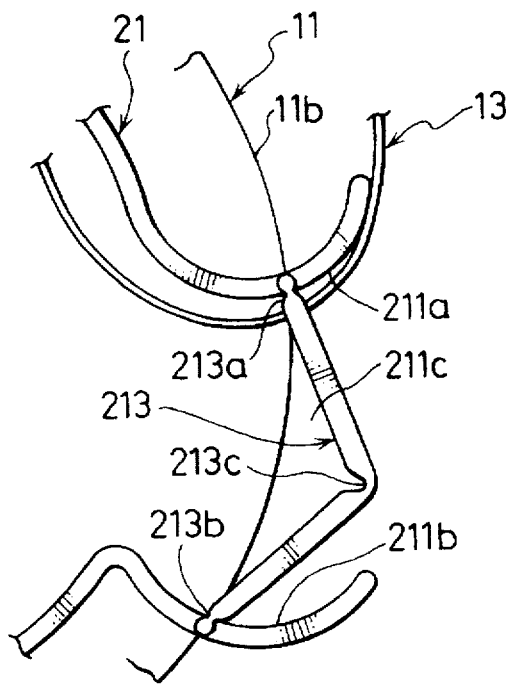
FIG. 15 is a view showing a fifth example of the bridge portion of the moving member in the relay apparatus for relatively rotating members in FIG. 8, and is a view corresponding to the view in the direction X in FIG. 9.
Figure 16:
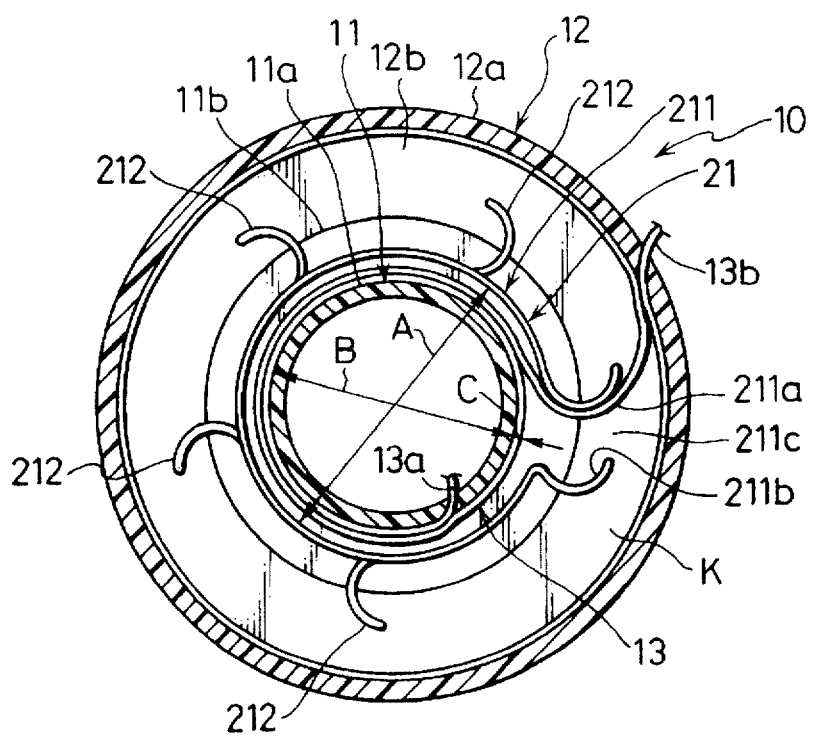
FIG. 16 is a sectional view showing a main part of a relay apparatus for relatively rotating members according to a third embodiment of the present invention.
Figure 17:
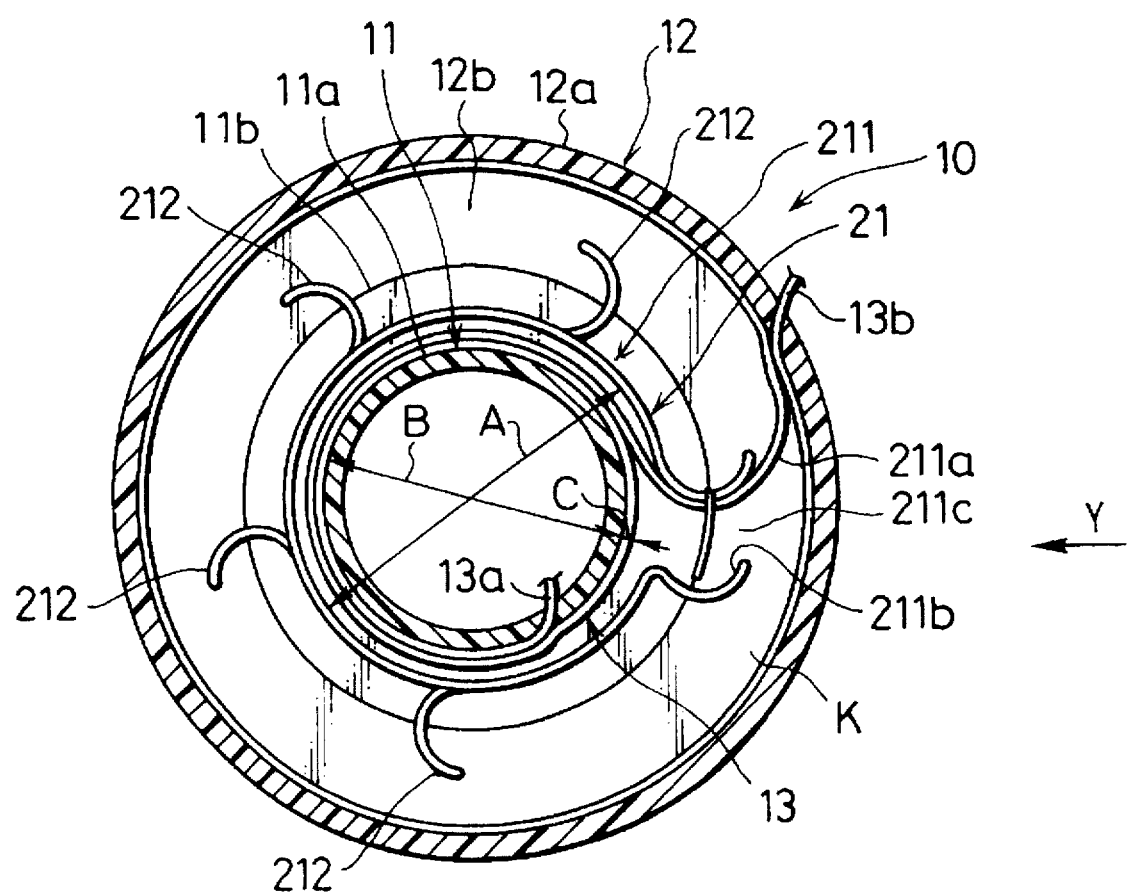
FIG. 17 is a sectional view showing a main part of a relay apparatus for relatively rotating members according to a fourth embodiment of the present invention.
Figure 18:
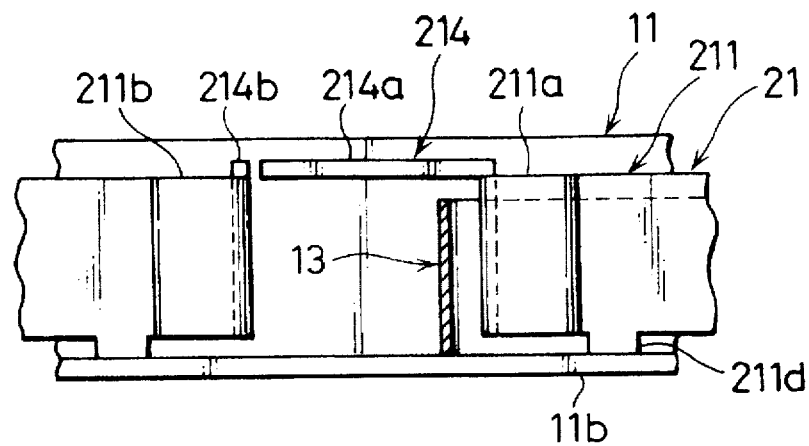
FIG. 18 is a view showing a stopper means of a moving member in the relay apparatus for relatively rotating members in FIG. 17.
Figure 19:
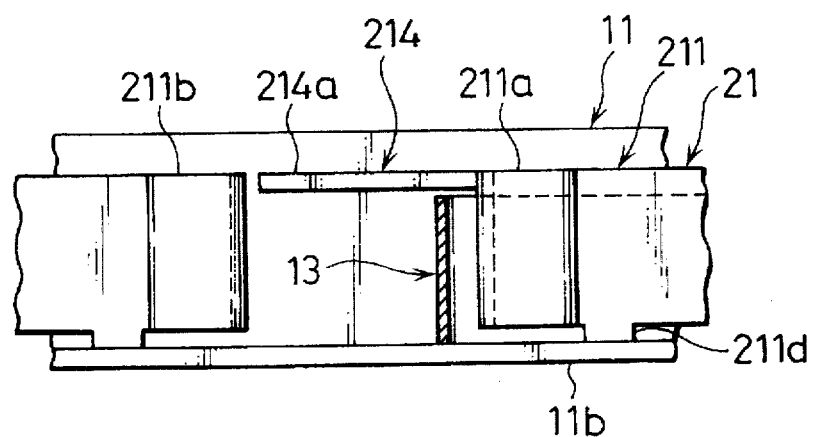
FIG. 19 is a view showing a first example of the stopper means of the moving member in the relay apparatus for relatively rotating members in FIG. 17, and is a view corresponding to the view in the direction Y in FIG. 17.
Figure 20:
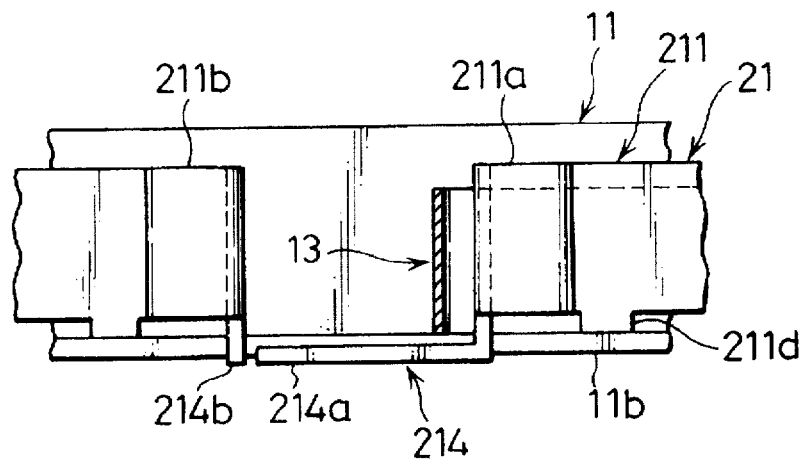
FIG. 20 is a view showing a second example of the stopper means of the moving member in the relay apparatus for relatively rotating members in FIG. 17, and is a view corresponding to the view in the direction Y in FIG. 17.
Figure 21:
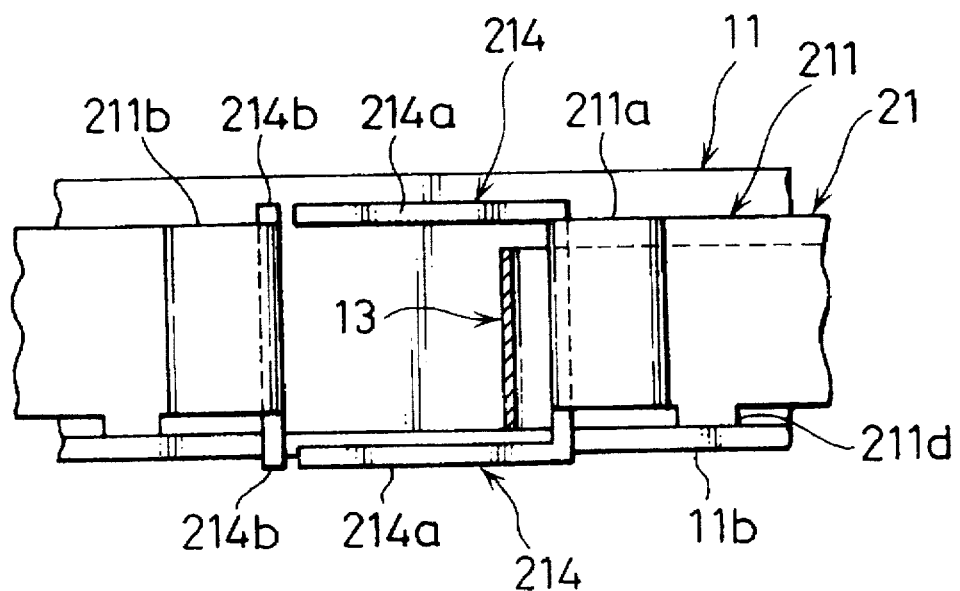
FIG. 21 is a view showing a third example of the stopper means of the moving member in the relay apparatus for relatively rotating members in FIG. 17, and is a view corresponding to the view in the direction Y in FIG. 17.
Figure 22:
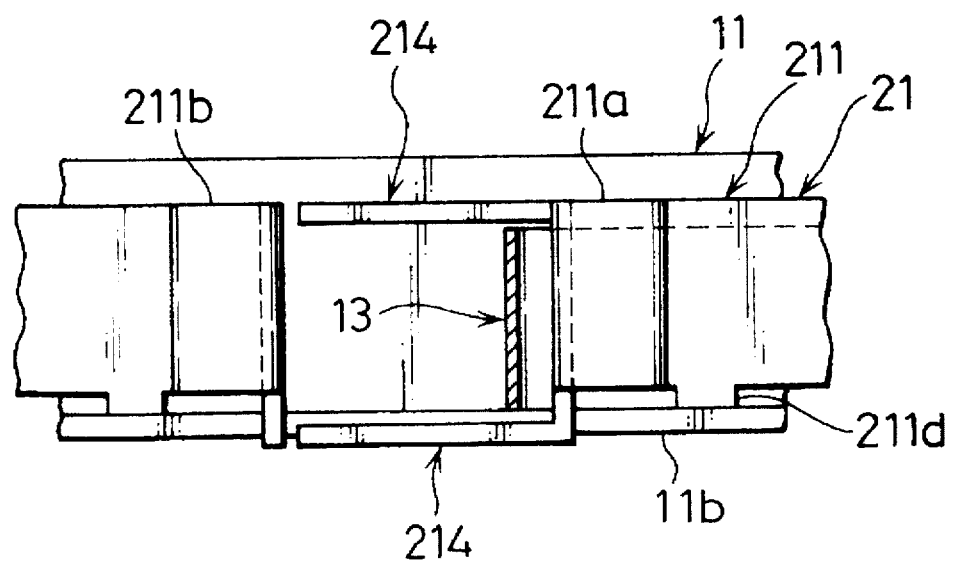
FIG. 22 is a view showing a fourth example of the stopper means of the moving member in the relay apparatus for relatively rotating members in FIG. 17, and is a view corresponding to the view in the direction Y in FIG. 17.

Embodiments of the present invention will be described below with reference to FIGS. 1 to 22. FIGS. 1 to 4 show a first embodiment, FIG. 5 shows a first example of a moving member in the first embodiment, FIG. 6 shows a second example of the moving member, FIG. 7 shows a third example of the moving member, FIGS. 8 to 10 show a second embodiment, FIG. 11 shows a first example of a bridge portion in the second embodiment, FIG. 12 shows a second example of the bridge portion, FIG. 13 shows a third example of the bridge portion, FIG. 14 shows a fourth example of the bridge portion, FIG. 15 shows a fifth example of the bridge portion, FIG. 16 shows a third embodiment, FIGS. 17 to 18 show a fourth embodiment, FIG. 19 shows a first example of a stopper means in the fourth embodiment, FIG. 20 shows a second example of the stopper means, FIG. 21 shows a third example of the stopper means, and FIG. 22 shows a fourth example of the stopper means.

The first embodiment will be described below with reference to FIGS. 1 to 4. A relay apparatus 10 for relative rotating members according to this embodiment comprises, as shown in FIG. 4, a member (first rotating member) 11 having an internal cylindrical portion 11a and a flange 11b annularly extending from the internal cylindrical portion 11a, a fixed member (second member) 12 having a external cylindrical portion 12a which surrounds the internal cylindrical portion 11a with a predetermined gap to form an annular space K, a flexible flat cable 13 which is stored along annular space K between the internal cylindrical portion 11a and the external cylindrical portion 12a and which has an inner peripheral portion 13a held by the internal cylindrical portion 11a and an outer peripheral portion 13b held by the external cylindrical portion 12a, and a C-shaped moving member 21, movably arranged along the space K, for inverting the flexible flat cable 13 in an opening 211c. An annular upper cover 14 for covering the opening above the space K is arranged above the internal cylindrical portion 11a.

Figure 1:
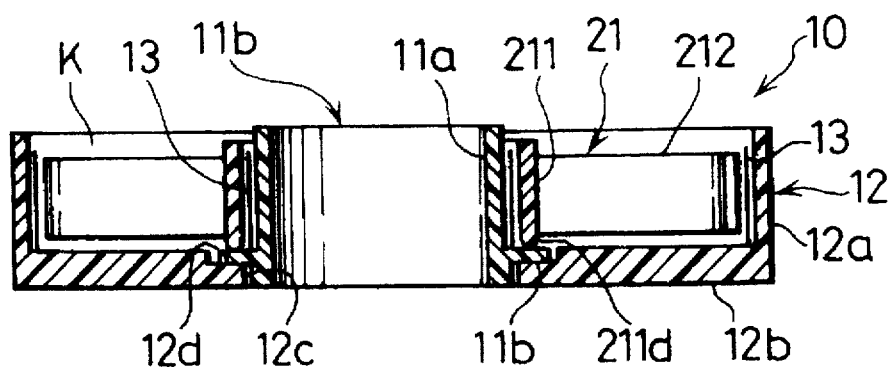
FIG. 1 is a sectional view showing a main part of a relay apparatus for relatively rotating members according to a first embodiment of the present invention.
Figure 2:
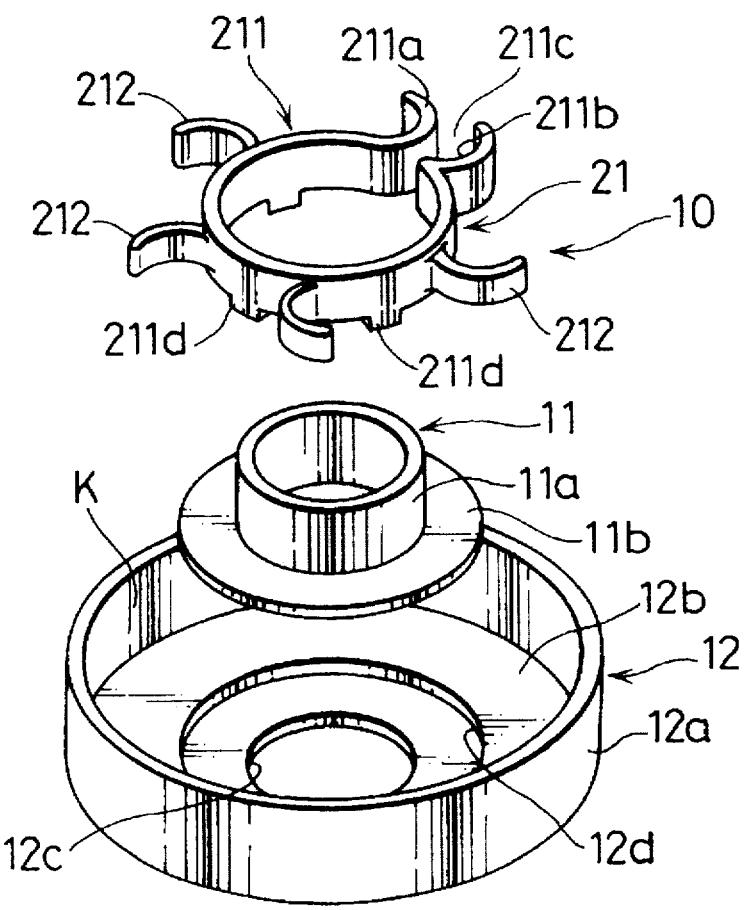
FIG. 2 is an exploded perspective view showing a main part of the relay apparatus for relatively rotating members in FIG. 1.
Figure 3:
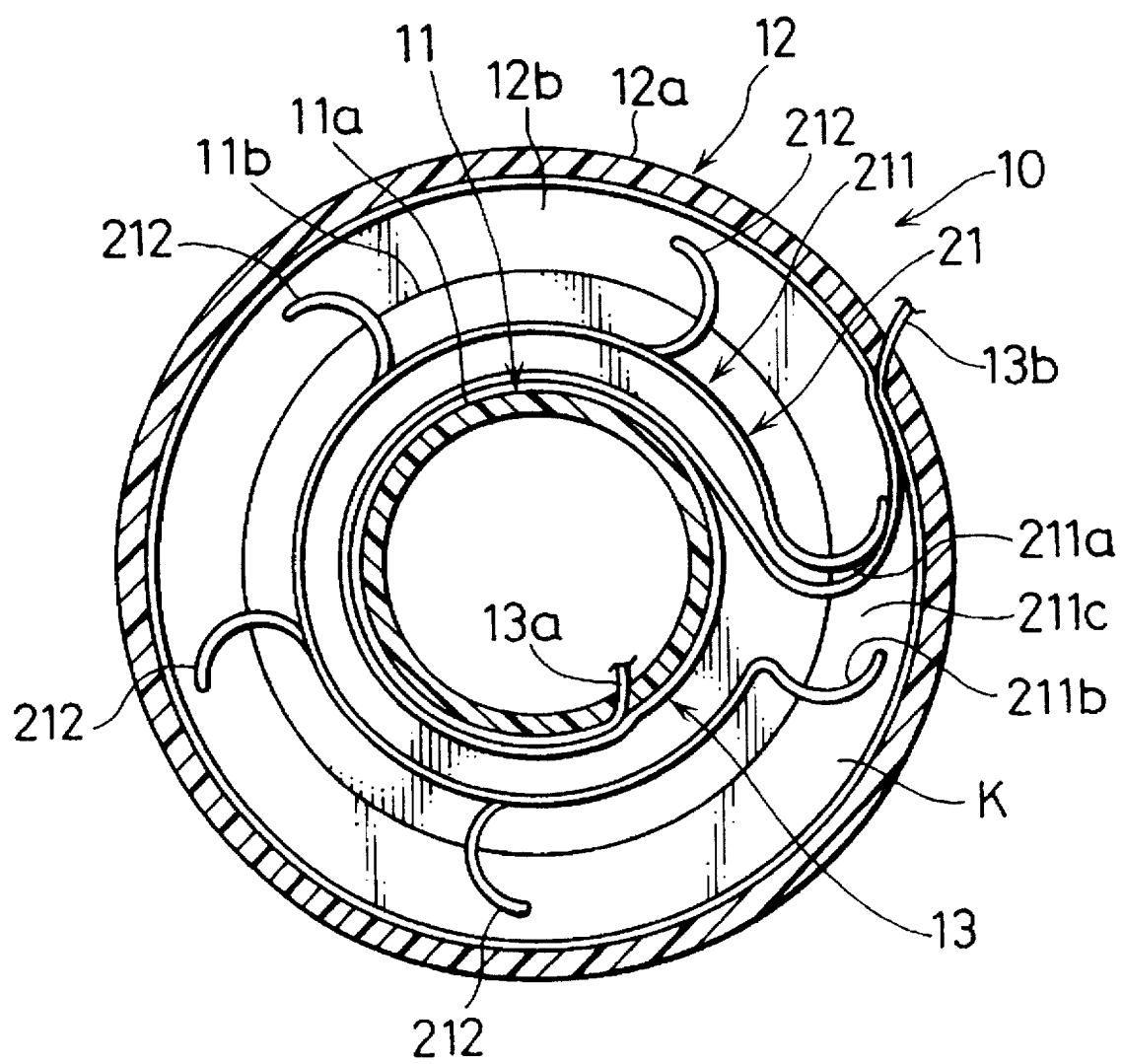
FIG. 3 is a plan view showing a main part of the relay apparatus for relatively rotating members in FIG. 1.

As shown in FIGS. 1 to 3, a lower cover 12b for covering the opening under the space K is integral with the external cylindrical portion 12a. A through hole 12c which rotatably holds the lower portion of the internal cylindrical portion 11a is formed in the lower cover 12b, and an annular recessed portion 12d for rotatably holding the flange 11b is formed in the lower cover 12b.

As shown in FIG. 3, the moving member 21 constitutes a thin C-shaped cylindrical portion 211, and the cable 13 is inverted through one opening end 211a or the other opening end 211b in an opening 211c of the cylindrical portion 211. The opening end 211a is a plate radially extending from cylindrical portion 211 and along which the cable 13 may be inverted in a U-shaped form. The other opening end 211b is a plate which radically extends from cylindrical portion 211 and is recessed to match the shape of the top portion of the cable 13 when inverted in a U-shaped form. Curved guide plates 212 which have almost the same shapes as those of the opening ends 211a and 211b are arranged on the outer peripheral portion of the cylindrical portion 211 at predetermined intervals.

The moving member 21 is integrally formed and made of a gliding material consisting of a resin material such as a teflon or fluorine polymer. The diameter of the moving member 21 in the radial direction can vary elastically by changing the gap or distance between one opening end 211a and the other opening end 211b in the opening 211c. The moving member 21 is designed such that only leg portions 211d formed on the cylindrical portion 211 are brought into contact with the flange 11b. More specifically, the rectangular leg portions 211d which are in slidable contact with the flange 11b are formed on the cylindrical portion 211 at predetermined intervals.

In use, for example, the rotating member 11 can be connected to a steering wheel side of the steering wheel portion of an automobile, and the fixed member 12 can be fixed to the steering column side.

In the relay apparatus 10 for relatively rotating members arranged as described above, referring to FIG. 3, when the internal cylindrical portion 11a rotates clockwise, the cable 13 is rewound from the internal cylindrical portion 11a and moves to be extended therearound while being in contact with the inner surface of the moving member 21. The cable 13 moves outside the moving member 21 while passing through the opening 211c of the moving member 21 to be inverted in a U-shaped form, and is brought into contact with the inner surface of the external cylindrical portion 12a. In this case, since the cable 13 is held by the internal cylindrical portion 11a, the cable 13 moves clockwise by an amount equal to an amount of movement of the internal cylindrical portion 11a. Since the moving member 21 is mounted on the flange 11b, the moving member 21 is moved clockwise together with the internal cylindrical portion 11a by equal amounts. Therefore, the internal cylindrical portion 11a, the cable 13 in the moving member 21, and the moving member 21 move in the same direction by almost equal amounts.

Since an amount of movement of the inverted portion of the cable 13 is smaller than an amount of movement of the moving member 21 or the like, the inverted portion of the cable 13 is brought into contact with one opening end 211a, and the amount of movement of the moving member 21 is made smaller than the amount of movement of the internal cylindrical portion 11a. For this reason, the moving member 21 slides on the flange 11b. An amount of sliding of the moving member 21 is advantageously smaller than that obtained when the moving member 21 is mounted on the lower cover 12b of the fixed member 12 which is not rotatably driven. Therefore, the sliding noise of the moving member 21 can be reduced.

When the cable 13 is rewound, the cable 13 is extended outside to be moved while being in contact with the inner surface of the moving member 21. For this reason, compression stress is generated in the cable 13, and the cable 13 buckles easily.

However, since the moving member 21 is designed such that the moving member 21 can be elastically deformed in the radial direction, the externally extending force of the cable 13 can be absorbed by the moving member 21. Therefore, compression stress generated in the cable 13 can be reduced, and the cable 13 can be prevented from buckling.

In addition, since the moving member 21 consists of a gliding material, a sliding resistance of the cable 13 against the moving member 21 can be reduced. Therefore, compression stress generated in the cable 13 can be further reduced, and the cable 13 can be prevented from buckling.

When the internal cylindrical portion 11a is rotated counterclockwise with respect to the external cylindrical portion 12a, the cable 13 moves to be wound on the internal cylindrical portion 11a. For this reason, the cable 13 outside the moving member 21 passes through the opening 211c of the moving member 21 while being in contact with the curved guide plates 212 to be inverted in a U-shaped form, and is inserted into the moving member 21 to be wound on the internal cylindrical portion 11a. In this case, the internal cylindrical portion 11a, the cable 13 in the moving member 21, and the moving member 21 move in the same direction by almost equal amounts.

However, since the amount of movement of the inverted portion of the cable 13 is smaller than the amount of movement of the moving member 21 or the like, the inverted portion of the cable 13 is brought into contact with the other opening end 211b, the amount of movement of the moving member 21 is made smaller than the amount of movement of the internal cylindrical portion 11a. For this reason, the moving member 21 slides on the flange 11b. An amount of sliding of the moving member 21 is advantageously smaller than that obtained when the moving member 21 is mounted on the lower cover 12b of the fixed member 12 which is not rotatably driven. Therefore, the sliding noise of the moving member 21 can be reduced. In this case, since the cable 13 is drawn by the internal cylindrical portion 11a, there is no reason to be afraid of buckling of the cable 13.

As the moving member 21, moving members arranged as shown in FIGS. 5 to 7 may be used. More specifically, in the moving member 21 shown in FIG. 5, no curved guide plates 212 are arranged, a reinforcing rib 211e is arranged for the cylindrical portion 211 and the opening ends 211a and 211b. In the moving member 21 shown in FIG. 6, a plurality of curved guide plates 212 are arranged, and a rib 211e for reinforcing the curved guide plates 212, the cylindrical portion 211, and the opening ends 211a and 211b are arranged. In the moving member 21 shown in FIG. 7, a plurality of gliding portions 211f radially extending are arranged on the inner surface of the cylindrical portion 211. In this moving member 21, the cable 13 is brought into contact with the top portions of the gliding portions 211f. For this reason, the contact area between the cable 13 and the moving member 21 can be decreased. Therefore, since a sliding resistance of the cable 13 with respect to the moving member 21 can be reduced, the above arrangement is effective to reduce sliding noise and to prevent the cable 13 from being buckled. In addition, the gliding portions 211f are also effective to reinforce the cylindrical portion 211.

The second embodiment of the present invention will be described below with reference to FIGS. 8 to 10. The same reference numerals as in the first embodiment shown in FIGS. 1 to 4 denote the same parts in the second embodiment, and a description thereof will be omitted. A difference between the second embodiment and the first embodiment is that a bridge portion 213 is arranged in the opening 211c of a moving member 21.

More specifically, in the moving member 21, as shown in FIGS. 8 to 10, the bridge portion 213 for connecting one opening end 211a and the other opening end 211b of the moving member 21 is arranged. The bridge portion 213 is designed to be freely bent by changing the distance (gap) between one opening end 211a and the other opening end 211b.

The bridge portion 213 consists of a resin material such as teflon or fluorine polymer, and is integral with the moving member 21. The bridge portion 213 is designed such that the bridge portion 213 is bent by rooted hinges 213a and 213b and a central hinge 213c. The rooted hinges 213a and 213b and the central hinge 213c have small thicknesses such that the bridge portion 213 is bent only when one opening end 211a and the opening end 211b are moved to be separated from each other or to be close to each other. For this reason, when the opening end 211a and the other opening end 211b are offset from each other in the axial direction, the offset in the axial direction is prevented by the bridge portion 213.

In addition, the bridge portion 213, as shown in FIG. 9, is arranged such that the central hinge 213c is inserted into the moving member 21. The bridge portion 213, as shown in FIG. 10, is arranged on one opening end 211a and the other opening end 211b not to prevent movement of the cable 13.

In the relay apparatus 10 for relatively rotating members arranged as described above, since the bridge portion 213 is freely bent by a change in distance between one opening end 211a and the opening end 211b, elastic deformation of the moving member 21 in the radial direction is not prevented by the bridge portion 213. Therefore, the elastic deformation of the moving member 21 in the radial direction prevents the cable 13 from being buckled. In addition, when no bridge portion 213 is arranged, the gap between one opening end 211a and the other opening end 211b may decrease by contraction of the resin material after molding, or the opening end 211a and the other opening end 211b may be offset from each other in the axial direction. However, since a resin material can be filled in a cavity with good balance by arranging the bridge portion 213, a decrease in the gap between one opening end 211a and the other opening end 211b caused by contraction after molding can be prevented. In addition, the offset between one opening end 211a and the other opening end 211b in the axial direction can be prevented by the bridge portion 213.

More specifically, when the bridge portion 213 is arranged, the molding accuracy of the moving member 21 can be improved. Therefore, the cable 13 can be stably guided by the moving member 21.

In the second embodiment, the bridge portion 213 is arranged on one opening end 211a and the other opening end 211b. However, as shown in FIG. 11, the bridge portion 213 is arranged such that the upper portions of the opposing portions of one opening end 211a and the other opening end 211b are connected to each other. In addition, the bridge portion 213, as shown in FIG. 12, may extend downward from the flange 11b to prevent the cable 13 from being moved.

Furthermore, the bridge portion 213 extending downward, as shown in FIG. 13, may be arranged together with the bridge portion 213 shown in FIG. 10, or, as shown in FIG. 14, may be arranged together with the bridge portion 213 shown in FIG. 11. The bridge portion 213, as shown in FIG. 15, may be arranged such that the central hinge 213c is bent to extend outside the moving member 21. In addition, the bridge portions 213 shown in FIGS. 9 to 15 may be arranged in the moving members 21 shown in FIGS. 5 to 7, respectively.

The third embodiment of the present invention will be described below with reference to FIG. 16. The same reference numerals as in the first embodiment shown in FIGS. 1 to 4 denote the same parts in the third embodiment, and a description thereof will be omitted. A difference between the third embodiment and the first embodiment is that the inner surface of a moving member 21 is in contact with a cable 13.

More specifically, as shown in FIG. 16, an inner diameter A of the moving member 21 is set to be a diameter such that the cable 13 wound on the internal cylindrical portion 11a and externally extending by elastic force is brought into contact with the inner surface of the moving member 21. Since FIG. 16 shows a state wherein the cable 13 is wound on the internal cylindrical portion 11a at a high density, the cable 13 is not in contact with the inner surface of the moving member 21. However, the cable 13 extends outside by elastically extending force to be brought into contact with the inner surface of the moving member 21.

The inner diameter A of the moving member 21 is set to be a diameter slightly larger than the outer diameter of the cable 13 wound on the outer periphery maximum times at a high density. More specifically, when the outer diameter of the internal cylindrical portion 11a is represented by B; the thickness of the cable 13, C; and the number of the cables 13 which overlap at a high density in the circumferential direction, X, the inner diameter A is preferably set to satisfy the following conditions: $A>(B+C\times X)$ and $A \approx (B+C\times X)$.

In the relay apparatus 10 for relatively rotating members arranged as described above, since the inner surface of the moving member 21 is brought into contact with the cable 13 elastically extending, movement of the moving member 21 in the radial and axial directions is limited by the cable 13. For this reason, noise generated by bringing the moving member 21 into contact with an external cylindrical portion 12a or noise generated by bringing the moving member 21 into contact with an upper cover 14 (see FIG. 4) or a lower cover 12b (see FIG. 4) can be prevented.

When the inner diameter A of the moving member 21 is set to be slightly larger than the outer diameter of the flexible flat cable 13 wound on the outer periphery of the internal cylindrical portion 11a maximum times at a high density, the cable 13 can be wound in the moving member 21 with a sufficient margin inside the moving member 21 by rotation of the rotating member 11. Since the thickness C of the cable 13 is set to be very small, and an amount of elastic extension of the cable 13 from the internal cylindrical portion 11a is considerably larger than the thickness C. For this reason, even if one cable 13 is wound on the internal cylindrical portion 11a, the cable 13 elastically extends to be brought into contact with the inner surface of the moving member 21. Therefore, noise generated by moving the moving member 21 can be prevented.

In the third embodiment, as the moving member 21, the moving member 21 having a diameter which can be elastically changed is used. However, if a moving member 21 having a diameter which cannot be elastically changed is used, movement of the cable 13 into/from the moving member 21 is not prevented.

The number X of cables 13 described above is preferably set to be 6. More specifically, the cable 13 is preferably wound on the internal cylindrical portion 11a three times for the following reason. That is, if the cable 13 is wound on the internal cylindrical portion 11a four or more times, the length of the cable 13 is excessively large, and movement of the cable 13 becomes unstable.

The fourth embodiment of the present invention will be described below with reference to FIGS. 17 and 18. The same reference numerals as in the third embodiment shown in FIG. 16 denote the same parts in the fourth embodiment, and a description thereof will be omitted. A difference between the fourth embodiment and the third embodiment is that the diameter of a moving member 21 decreases gradually over a period of time as relative rotation occurs and the a stopper means 214 is arranged in an opening 211c.

More specifically, the moving member 21, as shown in FIGS. 17 to 18, has an inner diameter A which decreases gradually over a period of time as relative rotation occurs and the lower limit of the inner diameter A is set by the stopper means 214 arranged in the opening 211c. The minimum inner diameter of the moving member 21 is set to be a diameter obtained by adding a thickness C of one cable 13 to an outer diameter B of an internal cylindrical portion 11a.

The moving member 21 has the inner diameter A which decreases gradually over a period of time as relative rotation occurs by increasing the thickness of the inner peripheral portion.

The stopper means 214 is integrally formed on the moving member 21, and has a stopper rod 214a arranged at one opening end 211a and a stopper projection 214b arranged at the other opening end 211b. When the stopper rod 214a is brought into contact with the stopper projection 214b, a decrease in diameter of the moving member 21 can be stopped.

In a relay apparatus 10 for relatively rotating members arranged as described above, the moving member 21 having a dimension which can be elastically varied in the radial direction, and the inner diameter A of the moving member 21 is decreased gradually over a period of time as relative rotation occurs. For this reason, the inner diameter A of the moving member 21 does not increase. In the future, a state in which the cable 13 wound on the internal cylindrical portion 11a is in contact with the moving member 21 can be kept. Therefore, noise generated by moving the moving member 21 can be prevented, a noise-proof effect can be held.

In addition, since the lower limit of the inner diameter A is set by the stopper means 214 arranged in the opening 211c, the inner diameter A of the moving member 21 can be prevented from being excessively small, and an increase in resistance of winding and rewinding the cable 13 in the moving member 21 can be prevented. Since the minimum inner diameter of the moving member 21 is set to be a diameter obtained by adding the thickness of one cable 13 to the outer diameter of the internal cylindrical portion 11a, at least the first cable 13 can be smoothly wound in the moving member 21. When the first cable 13 is wound in the moving member 21, other portions of the cable 13 can be continuously and smoothly wound in the moving member 21. More specifically, when the second or more flexible flat cables 13 are wound in the moving member 21, the moving member 21 gradually increases in diameter. However, since the cable 13 is continuously formed to have a large length, resistance generated by an increase in diameter of the moving member 21 rarely increases.

The stopper means 214, as shown in FIG. 19, extends from one opening end 21a to the other opening end 21b to be brought into contact with the other opening end 21b, so that the stopper means 214 may be constituted by only the stopper rod 214a for stopping a decrease in the moving member 21.

In addition, the stopper means 214, as shown in FIG. 20, may be arranged to project downward from the flange 11b not to prevent movement of the cable 13. However, the stopper means 214 must be constituted by the stopper rod 214a and the stopper projection 214b because the stopper means 214 projects downward.

The stopper means 214 extending downward, as shown in FIG. 21, may be arranged together with the stopper means 214 shown in FIG. 18, or, as shown in FIG. 22, may be arranged together with the stopper means 214 shown in FIG. 19. The stopper means 214 may be arranged on the moving member 21, the bridge portion 213 may be arranged under the moving member 21, and the stopper means 214 and the bridge portion 213 may be upside-down. The stopper means shown in FIGS. 17 to 22 may be arranged in the moving members 21 shown in FIGS. 5 to 7, respectively.

In each of the first, second, third, and fourth embodiments, the first rotating member is rotatably driven as the first rotating member 11, and the second rotating member is fixed as the fixed member 12. However, the first rotating member may be fixed, and the second rotating member may be rotatably driven. In this case, the moving member 21 is inevitably mounted on the flange (lower cover 12b) formed on the second rotating member.

In each of the first, second, third, and fourth embodiments, even if no flange 11b on which the moving member 21 is mounted is arranged, buckling of the cable 13 can be prevented by elastic deformation of the moving member 21 in the radial direction.

What is claimed is:

1. A relay apparatus for relatively rotating members, comprising:

a first member having an internal cylindrical portion;

a second member having an external cylindrical portion which surrounds the internal cylindrical portion with a predetermined gap therebetween, wherein the external cylindrical portion is relatively rotated with respect to the internal cylindrical portion;

a flexible flat cable stored along an annular space between the internal cylindrical portion and the external cylindrical portion and including an inner peripheral portion held by the internal cylindrical portion and an outer peripheral portion held by the external cylindrical portion; and a C-shaped moving member having an inner diameter variable between a minimum and a maximum diameter, said moving member movably arranged along the space, for inverting said flexible flat cable in an opening thereof, wherein one of said first and second members is rotatably driven on a rotating side of said apparatus, the rotating member having a flange formed on its cylindrical portion, and having its peripheral portion of said flexible flat cable and said moving member arranged on the flange, and the other of said first and second members being on a stationary side of said apparatus and including a lower cover, the peripheral portion of said flexible cable of said other member being arranged on said lower cover.

2. A relay apparatus for relatively rotating members according to claim 1, wherein said moving member is integrally formed of a resin material, and the diameter of said moving member can be elastically varied by changing a gap between one opening end and another opening end of the opening.

3. A relay apparatus for relatively rotating members according to claim 2, wherein a bridge portion for connecting one opening end and the other opening end in the opening of said moving member is arranged, and said bridge portion can be flexibly bent by changing the gap between one opening end and the other opening end.

4. A relay apparatus for relatively rotating members according to claim 1, wherein said moving member's inner diameter is set to be a diameter such that when said flexible flat cable is wound on the internal cylindrical portion and externally extended by elastic force, the cable is in contact with said moving member.

5. A relay apparatus for relatively rotating members according to claim 1, wherein said moving member's inner diameter is set to be slightly larger than the outer diameter of said flat flexible cable wound tightly in its entirety on the internal cylindrical portion.

6. A relay apparatus for relatively rotating members according to claim 1 wherein said moving member's inner diameter is set to be a diameter determined by adding a value six times the thickness of the flexible flat cable to the outer diameter of the internal cylindrical portion.

7. A relay apparatus for relatively rotating members according to claim 2 wherein said moving member's inner diameter decreases gradually as relative rotation occurs the lower limit of the inner diameter set by a stopper means arranged in the opening, and the minimum inner diameter of said moving member is set to be a diameter determined by adding the thickness of one flexible flat cable to the outer diameter of the internal cylindrical portion.

8. A relay apparatus for relatively rotating members according to claim 1 wherein said moving member consists of a gliding material.

9. A relay apparatus for relatively rotating members comprising:

a first member having an internal cylindrical portion;

a second member having an external cylindrical portion which surrounds the internal cylindrical portion with a predetermined gap and is relatively rotated with respect to the internal cylindrical portion;

a flexible flat cable stored along an annular space between the internal cylindrical portion and the external cylindrical portion and including an inner peripheral portion held by the internal cylindrical portion and an outer peripheral portion held by the external cylindrical portion; and a C-shaped moving member having a variable inner diameter, said moving member movably arranged along the space for inverting said flexible flat cable in an opening thereof, wherein said moving member is integrally formed of a resin material, and the diameter of said moving member can be elastically varied by changing a gap between one opening end and another opening end of the opening, and wherein one of said first and second members is rotatably driven on a rotating side of said apparatus, the rotating member having a flange formed on its cylindrical portion, and having its peripheral portion of said flexible flat cable and said moving member arranged on the flange, and the other of said first and second members being on a stationary side of said apparatus and including a lower cover, the peripheral portion of said flexible cable of said other member being arranged on said lower cover.

10. A relay apparatus for relatively rotating members, comprising:

a first member having an internal cylindrical portion;

a second member having an external cylindrical portion surrounding the internal cylindrical portion and spaced therefrom by a predetermined gap, wherein one of first and second members is rotatably driven such that the external cylindrical portion is rotated relative to the internal cylindrical portion;

a flexible flat cable stored along an annular space between the cylindrical portions and including an inner peripheral portion held by the internal cylindrical portion and an outer peripheral portion held by the external cylindrical portion;

a C-shaped moving member, movably arranged along the space, for inverting said flexible flat cable in an opening thereof; and a bridge portion for connecting one opening end and another opening end of the opening in the moving member, and wherein one of said first and second members is rotatably driven on a rotating side of said apparatus, the rotating member having a flange formed on its cylindrical portion, and having its peripheral portion of said flexible flat cable and said moving member arranged on the flange, and the other of said first and second members being on a stationary side of said apparatus and including a lower cover, the peripheral portion of said flexible cable of said other member being arranged on said lower cover.

11. The relay apparatus of claim 10, wherein an inner diameter of said moving member can be varied by changing a gap between the opening ends of the opening therein.

12. The relay apparatus of claim 11, wherein the inner diameter is variable between a minimum and a maximum diameter.

13. The relay apparatus of claim 10, wherein said moving member has an inner diameter set to be a diameter such that when said flexible flat cable is wound on the internal cylindrical portion and externally extended by elastic force, the cable is in contact with said moving member.

14. The relay apparatus of claim 10, wherein said moving member has an inner diameter set to be slightly larger than the outer diameter of said flat flexible cable wound tightly in its entirety on the internal cylindrical portion.

15. The relay apparatus of claim 10 wherein said moving member has an inner diameter set to be a diameter determined by adding a value six times the thickness of the flexible flat cable to the outer diameter of the internal cylindrical portion.

16. The relay apparatus of claim 11 wherein said moving member's inner diameter decreases gradually as relatively rotation occurs, the lower limit of the inner diameter set by a stopper means arranged in the opening, and the minimum inner diameter of said moving member is set to be a diameter determined by adding the thickness of one flexible flat cable to the outer diameter of the internal cylindrical portion.

* * * * *

UNITED STATES PATENT AND TRADEMARK OFFICE
CERTIFICATE OF CORRECTION

PATENT NO. : 5,735,480
DATED : April 07, 1998
INVENTOR(S) : Kazuya ARAI et al.

It is certified that error appears in the above-identified patent and that said Letters Patent is hereby corrected as shown below:

On the Title Page, Item [57], in the Abstract, line 14, after "cable", delete "13", and after "portion", delete "21c"; and line 15, after "member", delete "11", and "as rotatably" should read --is rotatably--, and "and," should read --and--.

Claim 7, column 14, line 6, after "occurs", insert --,--.

Claim 9, column 14, line 30, after "space", insert --,--.

Claim 16, column 16, line 13, "relatively" should read --relative--.

Signed and Sealed this

Twenty-seventh Day of October, 1998

Attest:

BRUCE LEHMAN

*Attesting Officer*  *Commissioner of Patents and Trademarks*